United States Patent [19]
Wittmann et al.

[11] Patent Number: 5,833,263
[45] Date of Patent: Nov. 10, 1998

[54] SIDE AIRBAG

[75] Inventors: Robert Wittmann, Reutti; Frank Mueller, Herrlingen; Serge Niederkorn, Ulm; Martin Settele, Tomerdingen; Hans-Juergen Frueh, Merklingen, all of Germany

[73] Assignee: Takata (Europe) Vehicle Safety Technology GmbH, Ulm, Germany

[21] Appl. No.: 808,502

[22] Filed: Feb. 27, 1997

[30] Foreign Application Priority Data

Feb. 27, 1996 [DE] Germany ............... 196 07 342.1

[51] Int. Cl.$^6$ .................................................. B60R 21/20
[52] U.S. Cl. ................................. 280/728.3; 280/730.2; 24/704.1; 403/2
[58] Field of Search ..................... 280/728.3, 730.2, 280/730.1, 728.2, 728.1, 732; 24/704.1, 662; 403/2, 380, 407.1

[56] References Cited

U.S. PATENT DOCUMENTS

| | | | |
|---|---|---|---|
| 3,640,546 | 2/1972 | Brawn | 280/732 |
| 4,536,008 | 8/1985 | Brown, Jr. | 280/730.1 |
| 5,150,919 | 9/1992 | Sakakida et al. | 280/732 |
| 5,217,253 | 6/1993 | Pray | 280/732 |
| 5,303,951 | 4/1994 | Goestenkors et al. | 280/728.3 |
| 5,411,288 | 5/1995 | Steffens, Jr. | 280/728.3 |
| 5,458,365 | 10/1995 | Rogers et al. | 280/728.3 |
| 5,553,887 | 9/1996 | Karlow et al. | 280/730.2 |
| 5,669,627 | 9/1997 | Marjanski et al. | 280/728.3 |
| 5,676,393 | 10/1997 | Rose | 280/728.3 |

FOREIGN PATENT DOCUMENTS

| | | |
|---|---|---|
| 0 565 501 | 10/1993 | European Pat. Off. . |
| 38 00 652 | 3/1991 | Germany . |
| 2 281 259 | 3/1995 | United Kingdom . |
| 90/13457 | 11/1990 | WIPO . |

OTHER PUBLICATIONS

Patent Abstract of Japan, vol. 095 No. 009, JP 7–164997, Jun. 1995.
Patent Abstract of Japan, vol. 018 No. 653, JP 6–255438, Sep. 1994.

*Primary Examiner*—Peter C. English
*Attorney, Agent, or Firm*—Foley & Lardner

[57] ABSTRACT

An airbag module has a generator carrier (11) which is to be secured to a vehicle component and on which or in which there is arranged a generator (12) and also an inflatable gas bag (20) which is enclosed within a housing (13) closed on all sides. The housing (13) consists of two housing halves (14, 15) which are hingedly connected together and which are connected to one another by a two-member snap fastener (16,17). A separation of the two housing halves (14,15) can be effected by fracture of a desired fracture location (18) at the holding members (16,17) on triggering of the generator (12) and inflation of the gas bag (20).

7 Claims, 2 Drawing Sheets

SIDE AIRBAG

FIELD OF THE INVENTION

The invention relates to an airbag module. In particular, the invention relates to an airbag module including a generator carrier for receiving a generator and an inflatable gas bag enclosed in a two-part housing, the housing being separable to release the bag upon triggering of the generator and inflation of the bag.

DESCRIPTION OF THE RELATED ART

In side airbag modules, the housing enclosing the gas bag and the generator carrier generally consists of two housing halves which are hingedly connected together and which are also connected to one another at a second point remote from the hinge by a holder. The two housing halves separate from one another at the second connection point to release the gas bag on triggering of the gas generator and inflation of the gas bag. The prior art discloses connecting the two housing halves together by snap fastener means which, after the introduction of the generator carrier carrying the generator and of the folded gas bag, enables the two housing parts to be clipped together without problem. The snap fastener means of the prior art is designed such that, on triggering of the generator and inflation of the gas bag, the holding members release from one another once a predetermined minimum opening force is present, and as a result thee two housing parts separate from one another and release the gas bag to inflate into the environment.

A problem with these known airbag modules lies in the fact that it is very difficult to precisely adjust the force at which the holder releases the housing parts from one another. Thus, in the normal use of the vehicle in which the airbag module is installed, an undesired opening of the housing can arise, for example, due to vibrations.

SUMMARY OF THE INVENTION

The object of the present invention is to provide an airbag module which is assembled by simply clipping together the parts of the housing, thereby forming the housing, but in which an undesired opening of the housing is reliably prevented in the normal operation of the vehicle.

The concept underlying the invention is related to the snap fastener means which enables a simple clipping together of the several parts of the housing. In particular and in accordance with this invention, the complementary shaping of the two co-operating holding members is such that the clipped or snap-fitted connection can no longer release during an attempt to separate the several clipped together pieces of the housing. That is, the two clipped together pieces of the housing resist separation under normal forces because the two parts of the holder are inseparably connected together in the manner of a latch by pure tensile forces. Rather than effecting separation at the connection between the holding members, one of the two holding members has a desired fracture location so that, on triggering of the generator and the associated inflation of the gas bag, the desired fracture location breaks once a predetermined opening force is present. The relevant holding member separates from the associated part of the housing while the actual latched connection between the two holding members is maintained. The force required to break a desired fracture location can be very accurately predetermined, and can indeed be made comparatively large. Accordingly, with the air bag module of the present invention, there is little or no danger that the holding members will separate from one another automatically during installation or during normal vehicle operation. Only in the event of danger is a breakage of the desired fracture location produced on triggering of the generator.

According to one aspect of the invention, the snap fastener includes a hoop and latching tongue.

Preferably, the part of the holding member which has been freed on fracturing of the desired fracture location cannot be accelerated away from the housing in the direction of the vehicle occupants on inflation of the gas bag. The inventive concept in this respect can thus be seen in the fact that the part of the holding member which has been freed by the breaking open of the desired fracture location is so reliably held by the other holding member that it remains with the relevant part of the housing and cannot fly around and cause damage.

According to another aspect of the invention, the latching tongue includes a cover part so that when the fracture location breaks, the hoop does not fall out of the housing part.

Another aspect of the invention provides a housing including a plurality of axially spaced apart holders.

BRIEF DESCRIPTION OF THE DRAWING

The invention will be described in the following by way of example and with reference to the drawing in which are shown.

DESCRIPTION OF THE PREFERRED EMBODIMENTS

Figure 1:
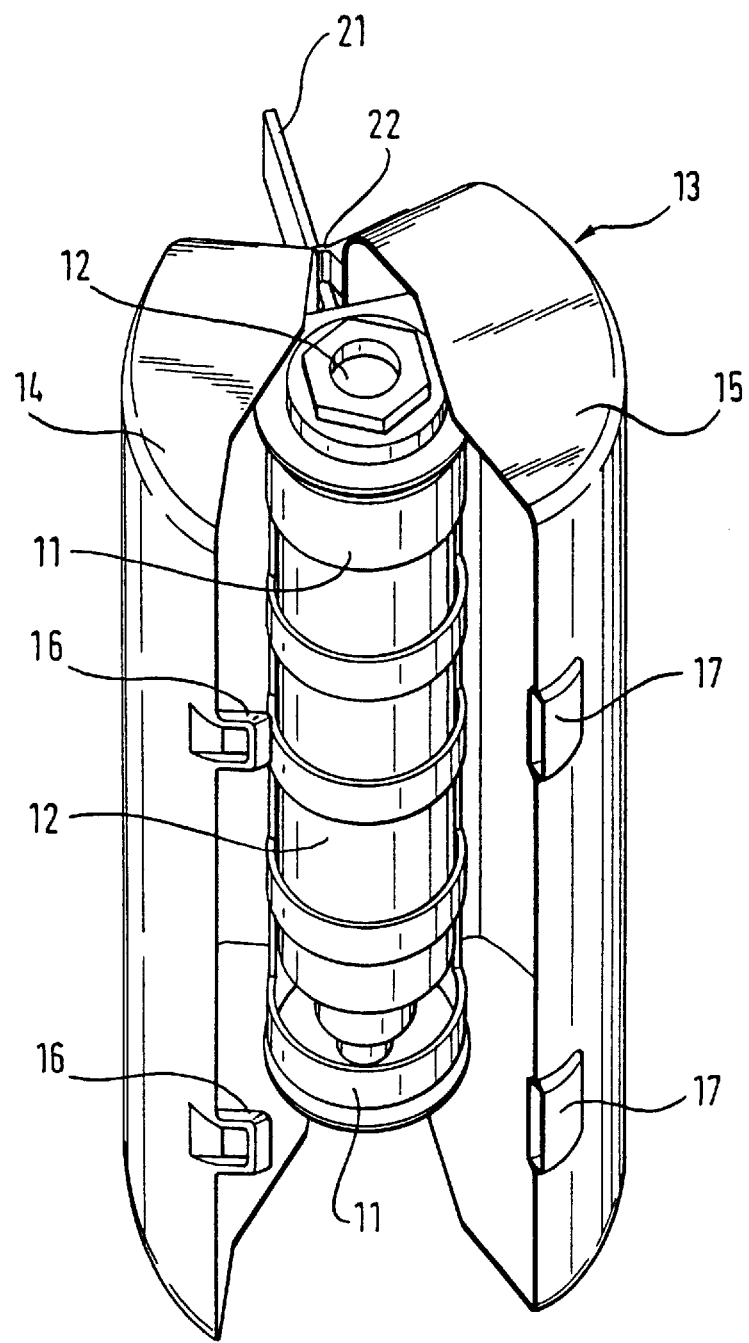
FIG. 1 schematic perspective illustration of a side airbag module in accordance with the invention, with the housing being shown partially opened and with the gas bag omitted, FIG. 2 a partial plan view of the housing of FIG. 1 in the area of a pair of holding members to an enlarged scale, with the holding members being shown in the state in which they are not yet connected together, and FIG. 3 a section on the line III—III in FIG. 2, with the holding members being shown in engagement with one another.

In accordance with FIG. 1, a right-cylindrical gas generator 12 is arranged in the interior of a right-cylindrical generator carrier 11 provided with apertures, with the generator carrier having two axially spaced apart attachment lugs 21 which extend perpendicular to the cylinder axis of the generator carrier 11 and serve for attachment of the airbag module to a vehicle part. This is a side airbag module which is attached vertically in the side of the back-rest of a vehicle seat facing the outer side of the vehicle in order to protect the side of the vehicle occupant from injury in the event of an accident.

A cylindrical housing 13 is mounted onto the lugs 21 and secured to them and consists of two housing halves 14, 15 which are hingedly connected together via a hinge 22 located in the region of the foot of the lug 21, with its axis extending parallel to the cylinder axis. At the diametrically opposite side, two axially spaced apart holders in the form of hoops 16 and latching tongues 17 are provided on the two halves 14, 15 of the housing.

In FIG. 1, the housing 13 is shown in the somewhat opened state to illustrate the interior space.

After the introduction of the gas bag, which is not shown in FIG. 1, into the housing 13 the two housing halves 14, 15 are swung together about the hinge 22, with the hoops 16 and the latch tongues 17 entering into a snap engagement with one another and with the housing being closed as well as the two housing halves 14, 15 being held in the closed position.

Figure 3:
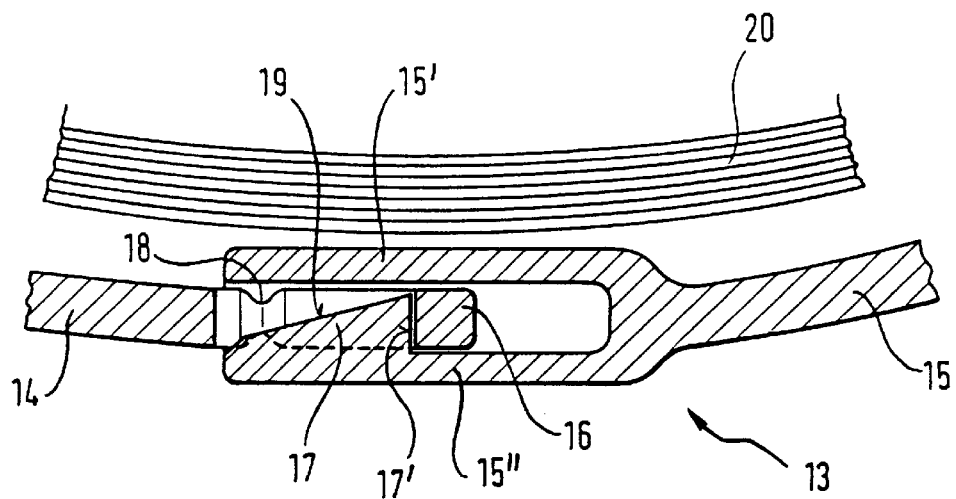
Figure 2:
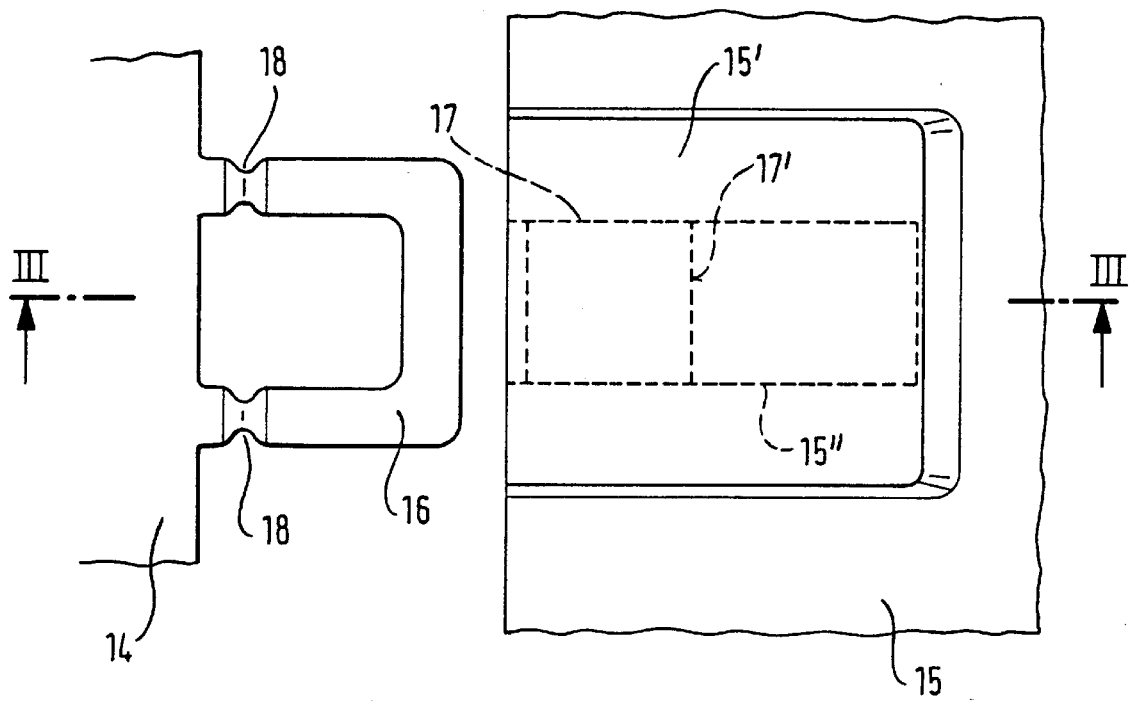

In accordance with FIGS. 2 and 3 the latch tongue 17 is mounted on a radially resilient arm 15" which extends in the circumferential direction from the one half 15 of the housing in the direction towards the other half 14 of the housing. At a distance radially inside of the arm 15", a cover part 15' extends from the housing part 15 in the peripheral direction beyond the latch tongue 17 up to the other housing half 14.

In accordance with the invention, the hoops 16 have two desired fracture locations 18 close to the transition into the half 14 of the housing.

Whereas in FIG. 2 the two halves 14, 15 of the housing are shown in the state in which they are still unconnected, FIG. 3 shows the two holding members 16, 17 in the engaged state. The gas bag 20 is also indicated in FIG. 3 and has been omitted in FIG. 1 for reasons of recognisability of the generator carrier 11 and of the generator 12.

In accordance with FIG. 3, the latch tongue 17 has a run-in ramp 19 which rises radially towards the inside away from the housing half 14 and which co-operates with the hoop 16.

The manner of operation of the described airbag module is as follows: After the introduction of the generator carrier 11 containing the generator 12 and of the gas bag 20 which surrounds it into the opening of housing 13, the two housing halves 14, 15 are swung together. As the halves 14, 15 approach one another, the hoops 16 and the latch tongues 17, which are axially, radially and peripherally aligned with one another, approach one another in accordance with FIG. 2. Finally, the hoops 16 enter into the slots between the cover parts 15' and the spring arms 15". On further approach of the housing parts 14, 15 the transverse web of the hoop 16 runs up the run-in ramp 19 of the latch tongue 17 and presses the spring arm 15" resiliently downwardly. The cover part 15' could also be resiliently designed in an analogous manner and could resiliently deflect towards the inside on insertion of the hoop 16. If required, the two elements 15', 15" can both be made resilient.

Once the transverse webs of the hoops 16 have respectively reached the highest point of the run-in ramps 19, the spring arms 15" snap upwardly in accordance with FIG. 3 behind the transverse webs of the hoop 16, so that the relative position of each hoop and of each latch tongue 17 as shown in FIG. 3 is achieved.

Since, in accordance with the invention, the rear wall 17' of the run-up ramp 19 extends perpendicular to the periphery of the housing 13 in the region of the connection of the two housing halves 14, 15, this connection cannot be released if an attempt is made to separate the two housing halves 14, 15.

Once the latch 17 and hoop 16 have been connected, if the generator 12 is triggered during an accident and if the gas bag correspondingly inflates, then a separating force is ultimately generated between the two housing halves 14, 15 such that the desired fracture locations 18 at the base of the hoops 16 can no longer withstand this force and consequently the hoops 16 break. The two housing halves are now separated from one another at the side diametrically opposite to the hinge 22 and can, for example, enter into the position shown in FIG. 1 or into a position which is open further. In this way, the gas bag can unfold outwardly without problem.

As a result of each hoop 16 being locked into place between the cover part 15' and the spring arm 15", a situation is effectively avoided in which the hoop 16 separates from the housing 13 and endangers the occupants by flying around outside of the housing 13.

The housing 13 is invisibly installed within a vehicle seat. A desired fracture location is located with respect to the vehicle seat opposite to the point of connection between the two housing halves 14, 15 in the region of the holding members 16, 17 and tears open after the fracture of the desired fracture locations 18 and the subsequent inflation of the gas bag 20 in order to enable the inflation of the gas bag into the space in front of the backrest.

It is important for the invention that the two housing halves 14, 15 can be simply connected together without problem by clipping them together and that the separation can, however, only occur through fracture of the desired fracture locations 18 and cannot take place by opening of the snap connection 16, 17.

What is claimed is:

1. Airbag module comprising a generator carrier to be secured to a part of a vehicle and in which or on which a generator and also an inflatable gas bag are arranged, with the gas bag being enclosed in a housing closed on all sides and including at least two housing parts which are held together by a holder, the housing parts being separable from one another to release the gas bag on triggering of the generator and by the inflating gas bag while overcoming the holding force applied by the holder, characterised in that the holder comprises at least two complementary snap fastener members each secured to one housing part which, on assembling the housing parts, come into engagement during the assembly and thereby automatically snap into a latched position, but which are, however, not separable from one another on triggering of the generator and by the inflating gas bag; and in that at least one of the snap fastener members has at least one desired fracture point with the force required to fracture it being matched to the pressure force generated on triggering of the generator in such a way that the at least one desired fracture point is, so that the housing parts move apart from one another and free the gas bag for inflation into the environment.

2. Airbag module in accordance with claim 1, characterised in that the snap fastener members comprise a hoop secured to one part of the housing via the at least one desired fracture point and a latching tongue which is secured to the other housing part and which fits together with the hoop, the latching tongue having a run-in ramp.

3. Airbag module in accordance with claim 2 characterised in that the hoop is secured at a side remote from the latching tongue against dropping out following fracture of the at least one desired fracture point by a cover part of the latching tongue provided at the other housing part.

4. Airbag module in accordance with claim 2, characterised in that, in the latched position, the fastener members are arranged relative to one another and to the housing parts such that they are held together after the fracturing of the at least one desired fracture point.

5. Airbag module in accordance with claim 1 characterised in that, in the latched position, the fastener members are arranged relative to one another and to the housing parts such that they are held together after the fracturing of the at least one desired fracture point.

6. Airbag module in accordance with claim 5, characterised in that, in the latched position, the fastener members comprise a hoop secured to one part of the housing via the at least one desired fracture point and a latching tongue secured to the other housing part for engaging the hoop; and further characterised in that the hoop is secured at a side remote from the latching tongue against dropping out following fracture of the at least one desired fracture point by a cover part provided at the other housing part.

7. Airbag module in accordance with claim 1, characterised in that the generator carrier comprises a substantially cylindrical generator carrier with fastening lugs in which the generator is accommodated and is housed together with the gas bag surrounding it in the housing which includes the two housing parts which are outwardly pivotably connected together by a joint parallel to an axis of the housing; and including a plurality of axially spaced apart holders provided at the housing parts at a side diametrically opposite to the joint.

\* \* \* \* \*